(12) United States Patent
Cimadamore et al.

(10) Patent No.: US 9,524,175 B2
(45) Date of Patent: Dec. 20, 2016

(54) TARGET TYPING OF OVERLOADED METHOD AND CONSTRUCTOR ARGUMENTS

(71) Applicant: Oracle International Corporation, Redwood City, CA (US)

(72) Inventors: Maurizio Cimadamore, Dublin (IE); Daniel Lee Smith, Spanish Fork, UT (US); Brian Goetz, Williston, VT (US)

(73) Assignee: Oracle International Corporation, Redwood City, CA (US)

( * ) Notice: Subject to any disclaimer, the term of this patent is extended or adjusted under 35 U.S.C. 154(b) by 358 days.

(21) Appl. No.: 13/677,001

(22) Filed: Nov. 14, 2012

(65) Prior Publication Data

US 2014/0137087 A1 May 15, 2014

(51) Int. Cl.
*G06F 9/45* (2006.01)
*G06F 9/44* (2006.01)
*G06F 9/455* (2006.01)

(52) U.S. Cl.
CPC ......... *G06F 9/4425* (2013.01); *G06F 9/45516* (2013.01)

(58) Field of Classification Search
CPC .............. G06F 8/41; G06F 8/443; G06F 8/447
USPC ........................................................ 717/140
See application file for complete search history.

(56) References Cited

U.S. PATENT DOCUMENTS

| | | | |
|---|---|---|---|
| 5,748,966 A | 5/1998 | Sato | |
| 6,948,156 B2 | 9/2005 | Sokolov | |
| 7,086,041 B2 | 8/2006 | Plesko et al. | |
| 7,350,198 B2 | 3/2008 | Kluger et al. | |
| 7,574,700 B2 | 8/2009 | Bracha | |
| 7,685,581 B2 | 3/2010 | Plesko et al. | |
| 7,739,676 B1 | 6/2010 | Karr et al. | |
| 2007/0044083 A1* | 2/2007 | Meijer et al. | 717/151 |
| 2009/0150863 A1 | 6/2009 | Guo et al. | |
| 2012/0216077 A1 | 8/2012 | Christensen et al. | |

OTHER PUBLICATIONS

"The State of Lambda", Dec. 2011, OpenJDK, 4th edition, 9 pages.*
U.S. Appl. No. 13/563,587, filed Jul. 31 2012, Joseph D. Darcy.

* cited by examiner

*Primary Examiner* — Hang Pan
*Assistant Examiner* — Hui-Wen Lin
(74) *Attorney, Agent, or Firm* — Robert C. Kowert; Meyertons, Hood, Kivlin, Kowert & Goetzel, P.C.

(57) ABSTRACT

Methods and apparatus for target typing of overloaded method and constructor arguments are described. A method comprises determining whether source code of a program includes, as an argument to an overloaded operation invocation, an expression whose type is context-dependent. The method further comprises, if the source code includes such an argument, providing the expression as an input to an overload resolver, and determining at the overload resolver whether (a) each argument of the invocation is compatible with types of corresponding parameters in one or more declarations and (b) whether a particular declaration among such a set of declarations can be identified as the most specific. If both conditions are met, the method comprises generating executable instructions for the invocation.

19 Claims, 6 Drawing Sheets

TARGET TYPING OF OVERLOADED METHOD AND CONSTRUCTOR ARGUMENTS

BACKGROUND

In recent years, object-oriented programming languages such as Java™ have become increasingly popular for a wide variety of applications running on many different types of platforms. Many such programming languages support overloading of invocable operations such as methods and constructors, allowing programmers to create several methods with the same name within a given class, or several constructors for a given class. Within a given set of overloaded invocable operations, the individual operations may differ from one another in various ways—e.g., in the number of parameters, the types of the parameters, or the return types in the case of methods. Support for overloading relieves programmers of the burden of having to make up different names for methods or constructors that provide similar functionality, and therefore should ideally not be forced to have different names. Compilers (or other tools that perform type checking, such as certain kinds of interpreters) for programming languages that support overloading have to perform overload resolution, i.e., they have to determine, for a given invocation, which among a set of overloaded methods or constructors is the appropriate or intended one for which executable code should be generated.

Historically, it is common for many such programming languages to require that the arguments to an invocation (e.g., an invocation of an overloaded method) be completely typed (i.e., that the types of all the arguments be determined) before the invocation can itself be typed by the compiler. However, the type of many constructs that are of increasing interest to programmers, and are therefore being considered for inclusion in various programming languages, such as lambda expressions, may be context-dependent—that is, the type of the construct may differ, depending on the surrounding context in which the construct is used. For example, the same lambda expression "( )→"done"" has different types in the following two contexts:

```
1.    Callable<String> c = ( ) → "done";
2.    PrivilegedAction<String> a = ( ) → "done";
```

This may present difficulties when a programming language is to support the use of such constructs as arguments to methods or constructors. Traditionally, the overload resolution component of a compiler relied upon being provided the types of the arguments to an invocation, but such argument type information may not be available when expressions whose type is context-dependent are used as arguments.

SUMMARY

Various embodiments of apparatus and methods for target typing of overloaded method and constructor arguments are described. The term "target typing" may be used herein to refer to the process of inferring the type of an expression whose type may vary depending on the surrounding context; the type expected in a particular context may be referred to as the "target type". More broadly, in at least some embodiments, the "target type" may be considered as the source of type information that allows the type of such an expression to be inferred. For example, using the latter broader definition, if E is the expression being considered, and T is a target type, the equation typeof(E)=f(T) may be generally applicable, where f is some function of the target type (f may be the identity function in some, but not all, cases). According to one embodiment, a system may include one or more computing devices configured to determine, for an overloaded operation invocation (such as an invocation of an overloaded method or an invocation of an overloaded constructor) identified in source code for a computer program, whether the source code includes, as an argument to the invocation, an expression whose type is context-dependent. If the invocation does have such an argument, the expression itself (rather than the type of the expression) may be provided as input to an overload resolver implemented at the computing device(s) in such an embodiment. The overload resolver may then determine whether at least the following two conditions hold: (a) whether each of the arguments of the invocation, including the expression, is compatible with a type of a corresponding parameter indicated in one or more invocable operation declarations (e.g., among the set of overloaded method declarations corresponding to the invocation) identified from the source code and (b) whether a particular invocable operation declaration of the one or more invocable operation declarations is identifiable as the most specific invocable operation declaration for the invocation, based at least in part on one or more specificity criteria defined for the language. Thus, in checking the first condition, the overload resolver may attempt to find a set of candidate method or constructor declarations whose parameter types are compatible with the expression, and in checking the second condition, the overload resolver attempts to select one of the candidate declarations (if any were found) as the most specific declaration (and therefore the declaration inferred to be the intended declaration) to be used to resolve the overloading in such an embodiment.

If both conditions hold, overload resolution may be deemed to have succeeded in such an embodiment, and the computing devices may generate executable instructions for the overloaded operation invocation in accordance with the particular declaration identified as the most specific declaration. If either condition does not hold, the overloading cannot be resolved, and an error indication may be generated in at least some embodiments. If multiple compatible candidate declarations are found (i.e., the first condition holds) in one embodiment, but the overload resolver cannot narrow down the multiple candidates to one most suitable candidate (where the relative suitability of the candidates may have to be determined based on language-dependent specificity criteria), the overload resolution fails, and an error indication (such as an "Ambiguous argument" error message) may be generated. Several different kinds of arguments whose type is context-dependent may be supported in various embodiments—e.g., lambda expressions may be used as arguments, or method references may be used.

In various embodiments, the computing devices may implement a tool such as a compiler or an interpreter, which may be responsible for generating executable instructions corresponding to the source code program. In order to check the first condition, e.g., to find candidate compatible method or constructor declarations, in some embodiments the tool may perform speculative typing analysis. Such speculative typing may involve using one or more potentially complex tests for assignability of an expression, rather than relatively simple tests for assignability of just a type. As part of the analysis, the tool may type an expression as if it appeared in a particular context, and then decide if an error would have occurred. Portions or branches of a parse tree for the source code may be generated speculatively for various candidate target declarations, discarded if found inapplicable, and retained if found applicable. Using this approach, the tool may check, for each of a set of overloaded method or constructor declarations, whether an assignment of the expression to a corresponding parameter of the declaration would fail or succeed. If the assignment would fail, the declaration may be discarded as incompatible. If all the arguments to the invocation can be assigned to corresponding parameters of the declaration without encountering errors, the declaration may be deemed compatible in such an embodiment.

In some embodiments, if a plurality of compatible declarations are found by the tool, further analysis may be conducted in accordance with rules or criteria specified for the language in use, e.g., criteria defined in the programming language specification or in other standards-related documents associated with the language. In one such embodiment, the plurality of candidates may be examined in pairs, with the intent of determining which of a given pair is more "specific" according to the criteria, and discarding the other declaration of the pair. In cases where the parameters of the declarations can be represented using function descriptors, for example, the tests may first compare the parameter types of the pair of declarations, and if the comparison of the parameter types is insufficient to indicate that one declaration of the pair is more specific than the other, the return types of the function descriptors may be compared. If the tests succeed in identifying a single declaration as the most specific, that declaration may be used for generation of executable code.

DETAILED DESCRIPTION OF EMBODIMENTS

It is noted that, while much of the following description refers to the use of a compiler for various operations, similar operations may be performed in some embodiments by a different tool, such as an interpreter, that is also responsible for type checking and overload resolution. For example, an interpreter may consume source code as input (just as a compiler does) and generate executable instructions using similar logic as described below with respect to a compiler. In cases where an interpreter is being used, the generated instructions may be executed forthwith, and may not be stored in a persistent form (e.g., as an executable version of the source program) as they typically would be if a compiler were used. The kinds of errors thrown when overload resolution fails, and the error messages provided, may differ in some cases between the compiler and the interpreter. It is also noted that, while for purposes of illustration, the following description is provided largely in the context of using the Java™ programming language (or a language closely related to Java™), the techniques described may be used for any programming language that supports overloading of invocation operations such as methods, constructors, or functions. The techniques may be used for object-oriented languages in some embodiments, or for non-object-oriented languages (such as various procedural languages) in other embodiments. The term "invocable operation" may be used herein to refer to methods, constructors, or to methods and constructors collectively. Method invocations, constructor invocations, or method invocations and constructor invocations collectively may be termed "operation invocations", or simply "invocations", herein.

Figure 1:
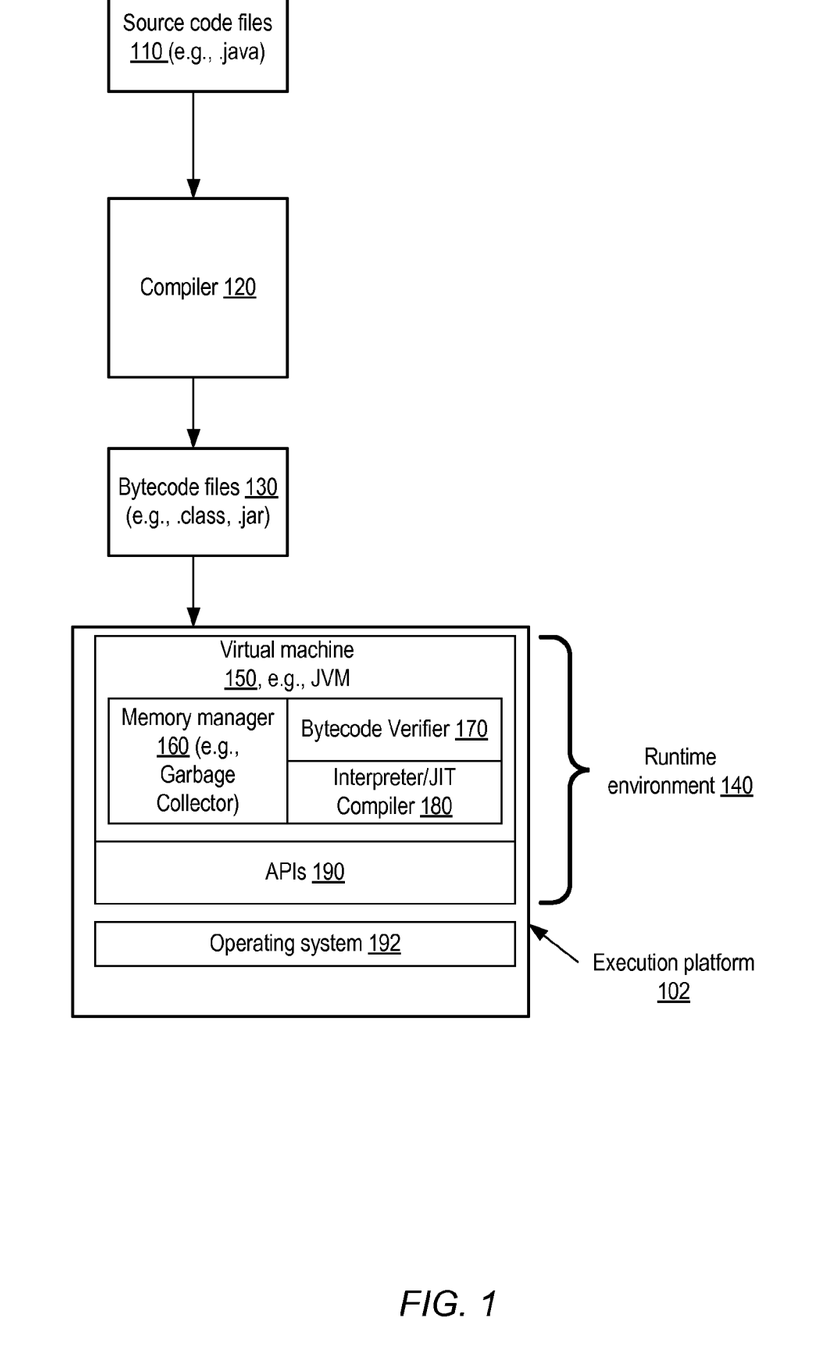
FIG. 1 illustrates a workflow for compiling and executing a computer program specified in a high-level programming language, according to various embodiments.

FIG. 1 illustrates a workflow for compiling and executing a computer program specified in a high-level language that supports method and constructor overloading, as well as programming constructs whose types are context-dependent, according to various embodiments. According to the illustrated embodiment, the workflow begins when a compiler, such as compiler 120, receives source code for a computer program, such as files 110. In various embodiments, source code 110 may be specified in various high-level and/or object-oriented programming languages, such as Java™ and/or other languages. Source code may be provided as a set of .java files in embodiments where Java™ is being used. In some embodiments, source code 110 may be specified using a combination of languages, which may include one or more low-level and/or intermediate languages (e.g., assembly). In some embodiments, at least some of the source code may initially be written in a dynamically-typed high-level language, such as Python or Ruby, while in other embodiments, all of the source code may be in a statically-typed language such as Java™.

The compiler 120 may analyze the source code 110 to produce an executable version of the program, such as bytecode files 130 (e.g., .class files or .jar files in the case of Java™) in the depicted embodiment. Different types of executable code formats may be used in various embodiments; for example, binary machine language may be used instead of bytecodes. In some scenarios, parts of the executable code 130 may be in bytecode while others are in a native binary machine language. As part of compiling program source code 110 into executable code 130, the compiler 120 may perform a sequence of analysis operations and generate various intermediate data structures before generating the executable version, as described below in further detail with reference to FIG. 2. The compiler 120 may, for example, identify various method and constructor invocations, analyze the invocations based on the corresponding declarations, and decide, based on the information that can be determined at compile-time, whether a compile-time error should be generated. If a given invocation is determined to be acceptable for compilation, appropriate code may be generated for it.

As illustrated in FIG. 1, executable code 130 may be passed to an execution environment, such as run-time environment 140, which executes the code on an execution platform 102, thereby creating various output data and/or behavior. In various embodiments, the run-time environment 140 may include a virtual machine 150 (e.g., a Java™ Virtual Machine or JVM). The virtual machine 150 may in turn comprise a number of different components, such as a memory manager 160 (which may include a garbage collector), a bytecode verifier 170 to check the validity of the executable code, an interpreter and/or a just-in-time (JIT) compiler 180 such as the HotSpot compiler. The JIT compiler may in some embodiments be responsible for translating some or all of the bytecode (for example, heavily-used portions of bytecode) into platform-specific machine code to improve performance of the program execution. A run-time environment 140, such as the Java™ Runtime Environment or JRE, may also include code to implement a number of application programming interface (API) libraries 190 in some embodiments. The run-time environment 140 may run on top of lower-level software such as an operating system 192 in some embodiments. In embodiments where virtualized compute resources are being used as the execution platform, virtualization software such as a hypervisor may be used to configure the execution platform 102 for the operating system 192 (i.e., the operating system may run as an application on top of the hypervisor).

In different embodiments, the output or behavior produced as a result of the execution of the compiled code may include data stored in various levels of system memory (e.g., in-memory objects and/or data structures), on persistent storage (e.g., files on a file system), etc. The behavior may also include various program functionalities, such as displaying output on a screen, sending messages over a network, and/or otherwise interacting with various users and/or components.

In at least some embodiments, a compiler 120 or a similar tool may support target typing of overloaded method and constructor arguments. The term "target typing" may be used herein to refer to the process of inferring a type of an expression whose type may vary depending on the surrounding context (e.g., on the tokens that surround the expression in the source code); the type expected in a particular context may be referred to as the "target type". Expressions whose type is context-dependent may be referred to herein as "poly expressions". For an example of a poly expression, consider the constructor expression "new ArrayList< >( )" in Source Code Example 1 below:

Source Code Example 1

| 1.1. | List<String> ls = new ArrayList< >( ); |
| 1.2. | List<Integer> li = new ArrayList< >( ); |

In the first context (line 1.1), the expression returns a List of Strings; in the second context, it returns a List of Integers. Thus, the type of the expression cannot be determined by examining the expression alone; instead, the context in which the expression appears has to be taken into account.

Some programming languages may support "lambda expressions". Lambda expressions are a lightweight way to describe functions that can be treated as values by a programming language. In the case of some object-oriented programming languages, lambda expressions may be used as a lightweight mechanism for defining objects that have just one method and no state. In at least some embodiments, lambda expressions may be expressed using syntax such as the following:
(argument list)→body Lambda expressions may be considered examples of poly expressions in at least some languages; in other languages, lambda expressions may simply be normal expressions with a functional (or arrow) type S→T. Source Code Example 2 illustrates three lambda expressions according to one embodiment.

Source Code Example 2

| 2.1. | (int x, int y) → x + y |
| 2.2. | ( ) → 42 |
| 2.3. | (String s) → {System.out.println(s);} |

In line 2.1, the arguments of the lambda expression comprise two integer values, and the body computes the sum of the two values as the return value. In line 2.2, the lambda expression takes no arguments and returns the integer 42. In line 2.3, the lambda expression takes a single String argument, prints it out to the system output, and returns nothing. Note that lambda expression are "anonymous" in the depicted embodiment, in that they are not named. Next, consider an example of a lambda expression whose type is context-dependent, according to one embodiment:

Source Code Example 3

| 3.1. | Callable<String> c = ( ) → "done"; |
| 3.2. | PrivilegedAction<String> a = ( ) → "done"; |

The same lambda expression, ( )→"done", can thus have different types depending on the surrounding context. There are at least two ways in which lambda expressions may be context-dependent in at least some programming languages used in various embodiments. First, lambda expressions may produce objects that implement a particular interface, and the interface (and thus the expression) may be context-dependent. Second, in some cases, lambda expressions may have parameters that do not have declared types (e.g., "(x, y)→x+y"). In this latter scenario, the types of the body expressions may also be context-dependent. Lambda expressions are often expected to be used in nested contexts, such as arguments to method invocations or as results of other lambda expressions. The task of target typing for lambda expressions in nested contexts may be somewhat harder than in un-nested contexts such as straightforward assignments.

Lambda expressions enable definition of anonymous methods, and enable treating such anonymous methods as instances of functional interfaces. A similar approach may be used with existing methods as well, using a construct called "method references". According to one embodiment, a method reference may be treated in the same way as a lambda expression, but instead of providing a method body, a reference to an existing method of a class or object may be indicated, e.g., using the following syntax: <ClassName>::<ExistingMethodName>. Source Code Example 4 illustrates one example of a method reference:

Source Code Example 4

| 4.1. | class Person { |
| 4.2. | private final String name; |
| 4.3. | private final int age; |
| 4.4. | public static int compareByAge(Person a, Person b) { ... } |
| 4.5. | public static int compareByName(Person a, Person b) { ... } |
| 4.6 | } |
| 4.7. | Person[ ] people = ... |
| 4.8. | Arrays.sort(people, Person::compareByAge); |

The Arrays.sort call in line 4.8 includes, as an argument, the method reference "Person::compareByAge". The method reference in this example may be considered shorthand for a lambda expression whose parameter list is copied from Comparator<String>.compare and whose body calls Person.compareByAge. As with lambda expressions, therefore, a compiler may have to perform target typing for method references passed as arguments in at least some embodiments. Given the similarities in the treatment of lambda expressions and method references, the techniques described for various embodiments below with respect to lambda expressions may also be applied to method references in various embodiments.

Figure 2:
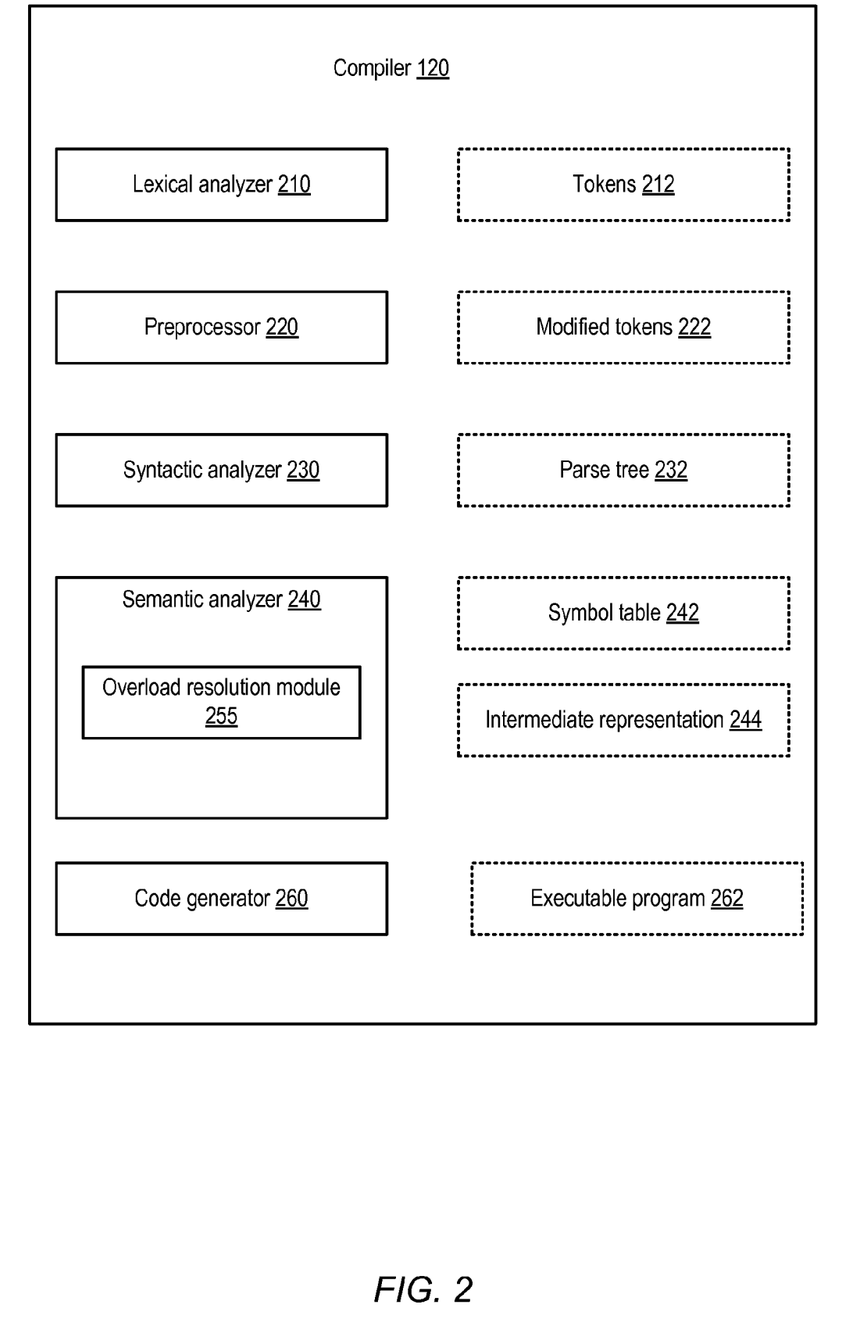
FIG. 2 is a block diagram illustrating the components of a compiler configured to support target typing of overloaded method and constructor arguments, according to at least some embodiments.

FIG. 2 is a block diagram illustrating the components of a compiler 120 configured to support target typing of overloaded method and constructor arguments, according to at least some embodiments. The compiler may be implemented in software and executed by a computer system on given source code, such as source code 110 of FIG. 1. In FIG. 2, solid outlines indicate functional components, while dashed lines indicate data structures passed among the functional components.

According to the illustrated embodiment, compiler 120 may include lexical analyzer 210, which may be configured to break the input source code into tokens, such as tokens 212. Each token 212 may correspond to a single atomic unit of the given language, such as keywords, identifiers, etc. In various embodiments, the token syntax may be represented as a regular language. Compiler 120 may include preprocessor 220 in the depicted embodiment, which may be used to support macro substitution in some languages. In some embodiments, preprocessor 220 may modify various ones of tokens 212, which may result in a set of modified tokens, such as 222.

Compiler 120 may also include a syntactic analyzer 230 in some embodiments, which may be configured to parse the modified tokens 222 to identify syntactic structure of the input program. The syntactic analyzer may be configured to build a parse tree, such as parse tree 232, which may organize the tokens 222 into a tree structure according to the formal grammar of the programming language of the source code.

In the depicted embodiment, the compiler 120 may further include a semantic analyzer 240, which may be configured to add semantic information to parse tree 232 to create an annotated internal representation of the program, such as intermediate representation 244. In some embodiments, a code generator, such as code generator 260, may convert the intermediate representation 244 into an executable program, such as 262. Executable program 262 may be encoded in binary and/or bytecode and may correspond to executable code 130 in FIG. 1.

In some embodiments, semantic analyzer 240 may also build and/or maintain a symbol table, such as symbol table 242, which maps various symbols in the source code to associated information, such as the location, scope, and/or type. The semantic analyzer 240 may also include an overload resolution module, such as module 255, to determine which among an overloaded set of methods or constructors is the one for which code should be generated for a given overloaded invocation. In some embodiments, the overload resolution module 255, which may also be referred to herein as an "overload resolver", may be a subcomponent of a type checker module of the semantic analyzer. If an overloaded invocation cannot be resolved, a compile-time error may be generated (such as the logical equivalent of "Ambiguous invocation"), and at least in some embodiments the compilation may fail. In some instances, warnings may be generated for certain invocations, instead of or in addition to compile-time errors. In various embodiments, different components of compiler 120 shown in FIG. 2 may be combined or further deconstructed into multiple components. The compiler may also implement various additional types of functions, such as optimization, line reconstruction, and the like, not shown explicitly in FIG. 2, in some embodiments.

The following example of overload resolution according to one embodiment, in which method arguments do not include expressions with context-dependent types, is provided as a preliminary to the subsequent discussion of the target typing for argument expressions with context-dependent types that may be performed by a compiler 120 or another similar tool in various embodiments. Consider the following overloaded declarations for a method in one embodiment, followed by an invocation:

Source Code Example 5

| 5.1. | void foo(String arg); // declaration 5.1 |
| 5.2. | void foo(Integer arg); // declaration 5.2 |
| 5.3. | void foo(Number arg); // declaration 5.3 |
| 5.4. | void foo(Object arg); // declaration 5.4 |
| 5.5. | foo(23); //invocation |

In this example, the type of the invocation argument (the integer or int 23) is not context-dependent. The overload resolver is provided the type of the argument (integer), and tries to find method signatures among the overloaded methods for which the argument type is a subtype, e.g., in accordance to the programming language's type hierarchy (for predefined types and libraries of the language) or in accordance with the source code (for programmer-generated classes). In this case, declarations 5.2, 5.3, and 5.4 have such signatures (foo(Integer), foo(Number), and foo(Object)), so these three are chosen as candidates from which a further selection may be performed to disambiguate the invocation in this embodiment. The first declaration, which has a String argument, is rejected as a candidate because the type of the argument (int) is incompatible with the type of the parameter (String) in the first declaration. From among the compatible candidate signatures, the compiler may select the one that is most "specific" (where specificity may be defined in the programming language specification or associated documentation, e.g., the method whose parameter type is lower in a type hierarchy than any of the other candidate methods' parameters may be deemed the most specific in some embodiments). In this case, assuming that subtype hierarchy depth is used as the criterion for specificity, since an Integer is a subtype of a Number, and a Number is a subtype of Object, the foo(Integer) declaration may be deemed the most specific and hence the result of the overload resolution process, so executable code corresponding to the foo(Integer) declaration may be generated.

It is noted that while, for simplicity, the majority of the source code examples provided herein cover methods and constructors with a single parameter, the techniques described may be extended to invocable operations with any number of parameters in various embodiments. Thus, for example, the approach described as being taken for target typing a single argument may be repeated N times for target typing of N arguments in some embodiments. In some implementations, overload resolution for different parameters may be performed in parallel.

In contrast to the relatively straightforward example of the overloaded foo method above, where the invocation argument's type was not context-dependent, consider the following example involving an argument to an overloaded method foo2 that is a poly expression.

Source Code Example 6

| 6.1. | void foo2(ArrayList<Integer> arg); // declaration 6.1 |
| 6.2. | void foo2(Set<Object> arg); // declaration 6.2 |
| 6.3. | foo2(new ArrayList < >( )); //invocation |

Here, unlike in the case where "23" was passed as an argument in Source Code Example 5, the type of the argument expression (new ArrayList< >( )) cannot be determined simply by examining the expression. As a result, at least in some embodiments, the overload resolver component of a tool such as a compiler or interpreter may be provided the argument expression itself as input (instead of, for example, being provided the type of the argument as input). The overload resolver may examine the poly expression argument speculatively, testing for compatibility with the different parameter types of the overloaded declarations, as described in more detail below. Such an approach may be termed "speculative typing" herein.

Generally speaking, type checking may be considered a routine that progressively attaches type information to the nodes of a parse tree that is internally used by a compiler or similar tool to store information about a source program. Such a tree may be initially blank—i.e., no type information may be contained within it; type checking may be thought of as "coloring" this tree with the appropriate type information. After type information is added to the tree for a given expression, it can later be used to perform other useful checks without re-examining the entire expression. In a simple scenario like the foo(23) example above, the parse tree would be colored with the type information (int) for "23". This would mean that checking as to whether a method is applicable or not may simply amount to checking whether the type information associated with the expression "23" is compatible with the type information associated with a formal parameter of the method. The type information (int in this case) would itself be passed to the overload resolution module of the type checker. In a more complex example such as foo2(new ArrayList < >( ));, speculative typing may be required in some embodiments. During speculative typing, a target type T may be selected from one of the method declarations, and a copy of the initially-blank parse tree for the expression may be colored under the assumption that the target type is T. That is, type checking may be speculatively performed for the statement T t=new ArrayList < >( ); This may be done in some implementations by passing the argument expression itself (not the type of the argument) as well as the type T as parameters for overload resolution. One significant difference between the two examples is that in the first example, "23" is type checked only once, regardless of the number of overloads. In the second example, in at least some embodiments, "new ArrayList< >( )" may have to be type checked once for each overloaded method—hence the term "speculative typing". (It is noted that in some implementations, optimizations to reduce the number of speculative type checks may be feasible). Several passes on the parse tree may thus be performed in such embodiments without knowing exactly which version of the tree will be retained at the end of the resolution process.

In some embodiments, separate branches of a parse tree representation of the program may be generated in the manner described above for speculative typing, corresponding to each overloaded declaration. In such embodiments, the branches corresponding to the declarations found incompatible may be discarded, while the branches corresponding to the declarations found compatible may be retained for a subsequent phase of overload resolution. The test for compatibility may be considered logically equivalent to determining whether an assignment of the expression to the parameter would result in an error: e.g., in this example, would the assignments "ArrayList<Integer> arg=new ArrayList< >( );" and "Set<Object> arg=new ArrayList< >( );" succeed, or result in an error. If the assignment would not result in an error, the corresponding declaration may be deemed a candidate for the next phase of overload resolution (in which, if more than one candidate is found, one particular candidate is selected as the most specific declaration or the inferred intended declaration). If the assignment would result in an error, the corresponding declaration may be rejected as a candidate for further consideration. In the above example of method foo2, declaration 6.2 would be rejected (as the corresponding assignment would not succeed), while declaration 6.1 would be selected as a candidate. If only one candidate declaration were found, that declaration would be selected as the most specific or most appropriate declaration, and the process of target typing of the argument would conclude, in at least some embodiments. If no candidate were found, overload resolution would fail, and an error indication may be generated (e.g., an "Incompatible argument" message or similar error message may be provided) at least in some embodiments.

The process of selecting candidate declarations is described in more detail below with respect to the description of FIG. 4. If more than one candidate declaration is found, a second phase of overload resolution may be initiated in some embodiments, in which an attempt to identify the single most specific or most appropriate candidate from among the set of candidates is made, e.g., using one or more specificity criteria. Further details regarding this phase for specific kinds of argument expressions are provided below in conjunction with the description of FIG. 5. It may be the case that no single most specific candidate may be found, in which case the second phase of the overload resolution may end in failure, and in some embodiments an error indication may be provided (e.g., a message such as "Ambiguous invocation detected" may be generated). Source Code Example 7, a slight variation on Source Code Example 6, illustrates one such scenario.

Source Code Example 7

| 7.1. | void foo3(ArrayList<Integer> arg); // declaration 7.1 |
| 7.2. | void foo3(Set<Object> arg); // declaration 7.2 |
| 7.3. | void foo3(List<String> arg); // declaration 7.3 |
| 7.4. | foo3 (new ArrayList < >( )); //invocation |

In this example, the List<String> declaration would be rejected using similar reasoning as in the case of Source Code Example 6. The remaining two declarations (7.1 and 7.3) would be deemed compatible with the invocation. However, based on the specificity criteria being used, it may be impossible to choose one of the two candidates as being more specific than the other, and as a result, a compile-time error may occur.

Source Code Example 8 illustrates a scenario in which a lambda expression is used as a method argument, according to one embodiment.

Source Code Example 8

| | |
|---|---|
| 8.1. | void foo4(Callable<String> c); // declaration 8.1 |
| 8.2. | void foo4(PrivilegedAction<Integer> a); // declaration 8.2 |
| 8.3 | void foo4(ActionListener al); // declaration 8.3 |
| 8.4. | foo4(( ) → "done"); //invocation |

In order to perform target typing for the lambda expression (( )→"done" in this example) in such a scenario where the overloaded declarations have function types (e.g., Callable<String>) as parameters, the "function descriptors" of the parameters in the foo4 declarations may have to be analyzed in the embodiment illustrated. (A "function type" represents a set of invocable operation definitions with a given signature—i.e., the invocable operations that have the same formal parameter types and return types. Function types may be represented in some object-oriented programming languages using functional interfaces, as illustrated in Source Code Example 9 below for one embodiment.) A "function descriptor" for a function type such as Callable<String> may comprise a representation of the combination of at least the list of parameter types and return type in at least some embodiments. (In one embodiment, the function descriptor may also include a representation of the thrown types.) For example, in the illustrated embodiment, the function descriptor for Callable<String> may be represented as "( )→String", indicating that it has no arguments and returns a String. Similarly, the function descriptor for PrivilegedAction<Integer> may be represented as "( )→Integer", indicating that PrivilegedAction has no parameters and returns an Integer. The function descriptor for ActionListener may be represented as "(ActionEvent)→void" indicating that it has one parameter of type ActionEvent and does not return anything. Upon analyzing the source code of Example 8 and the corresponding function descriptors, a compiler in some embodiments may determine the lambda expression (( )→"done") is incompatible with the ActionListener parameter of declaration 8.3, since the lambda expression has no parameters while the ActionListener has one parameter. The lambda expression may also be found incompatible with declaration 8.2, since the lambda expression returns a String rather than an Integer. However, the lambda expression may be found compatible with declaration 8.1, since the number (zero) of parameters for Callable<String> matches the number of parameters of the lambda expression, the types of the parameters are not an issue as there are no parameters, and the return type (String) matches as well. As a result, in the illustrated embodiment, declaration 8.1 may be deemed the result of the overload resolution, and executable instructions may be generated accordingly. If multiple declarations were found compatible on the basis of the analysis of their function descriptors, a determination for the most specific declaration among them may be conducted in the illustrated embodiment, e.g., using the kind of logic illustrated below with respect to FIG. 5. The term "descriptors" may be used to refer to "function descriptors" herein.

Figure 3:
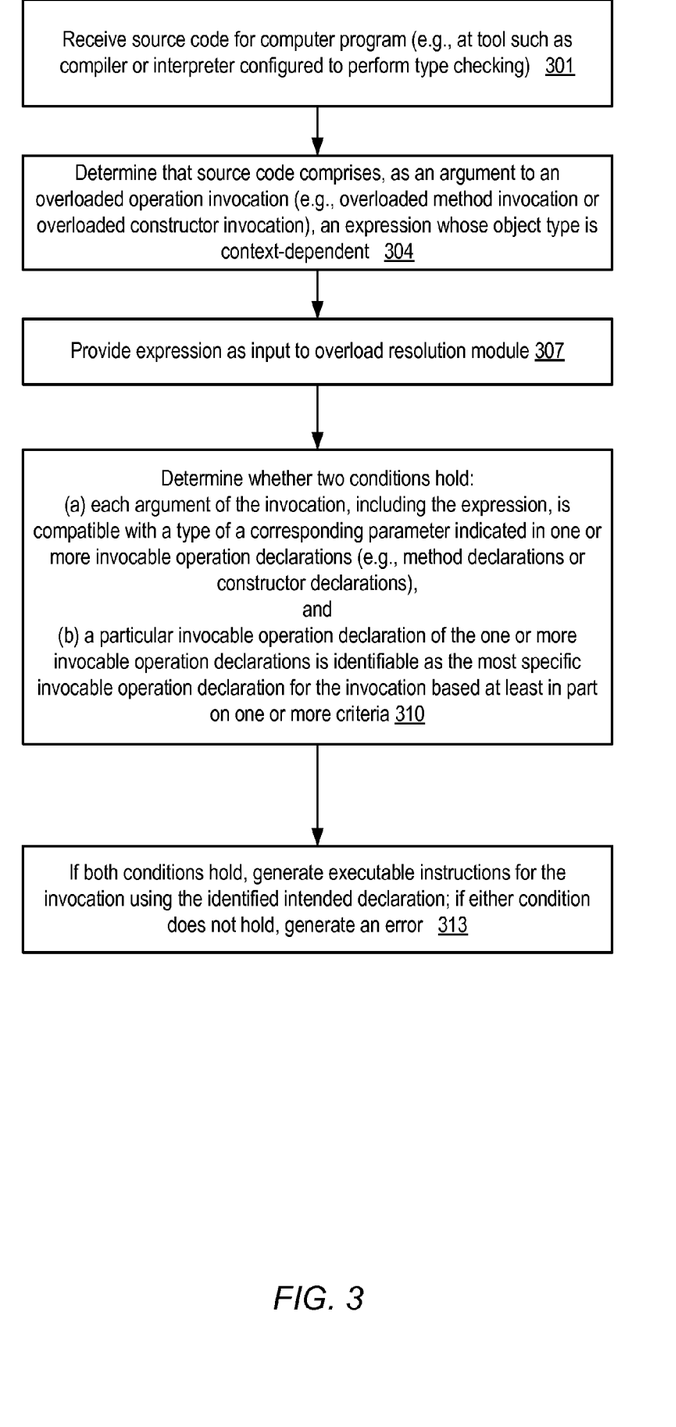
FIG. 3 illustrates aspects of operations that may be performed by a tool, such as a compiler or an interpreter, for target typing of overloaded method and constructor arguments, according to at least some embodiments.

FIG. 3 illustrates aspects of operations that may be performed by a tool, such as a compiler or an interpreter, for target typing of overloaded method and constructor arguments, according to at least some embodiments. As shown in element 301 of FIG. 3, source code for a computer program written in an object-oriented language may be received at the tool. The tool may analyze the source code to determine whether the code includes any invocations of an overloaded operation, and if so, whether any of the arguments of such an invocation comprises an expression (such as a lambda expression or a method reference) whose object-type is context-dependent. If the tool determines that the source code includes an invocation with both of these characteristics (element 304), the tool may proceed to perform target typing for the argument expression.

The argument expression may be provided as input to the overload resolver (element 307). The overload resolver may determine whether the following two conditions hold (one corresponding to the candidate declaration determination phase described above, and one corresponding to the selection of a best or most specific candidate among the candidates) in the depicted embodiment (element 310). The first condition is that each of the arguments of the invocation, including the argument expression, be compatible with the type of a corresponding parameter indicated in one or more invocable operation declarations (e.g., using the equivalent of the speculative typing based on assignment tests described above).

If the argument list of the invocation comprises more than one expression (including, potentially, more than one poly expression), each of the expressions may have to meet the compatibility criteria in such an embodiment. For each poly expression among the parameters, the speculative typing approach may be used in turn (or in parallel with the analysis of other parameters in some embodiments). For expressions whose type is not content-dependent, subtyping analysis of the kind illustrated in Source Code Example 4 above may be used. If even one argument expression is found incompatible with the corresponding parameter (i.e., the parameter in the same relative position within the list of parameters) in a declaration, the declaration may be deemed incompatible. For example, consider a declaration foo5(Type1 p1, Type2 p2, Type3 p3) with three parameters, and an invocation foo5 (arg1, arg2, arg3). For this declaration of foo5 to be found compatible in one embodiment and to be considered a candidate for the next phase of overload resolution, arg1 has to be compatible with p1, arg2 has to be compatible with p2, and arg3 has to be compatible with p3.

The second condition in the embodiment depicted in FIG. 3 is that, using one or more specificity criteria defined to narrow down the set of candidates to a single candidate, a particular invocable operation declaration of the compatible declarations in the earlier analysis be identifiable as the most specific operation declaration for the invocation. (Of course, in the trivial case that only one compatible declaration is found, the second condition would hold, since the only compatible declaration would by default be the "most" specific declaration). If both conditions hold, overload resolution and target typing may be deemed to have succeeded, and executable instructions corresponding to the invocation may be generated (element 313). If either condition does not hold, an error indication may be generated.

Figure 4:
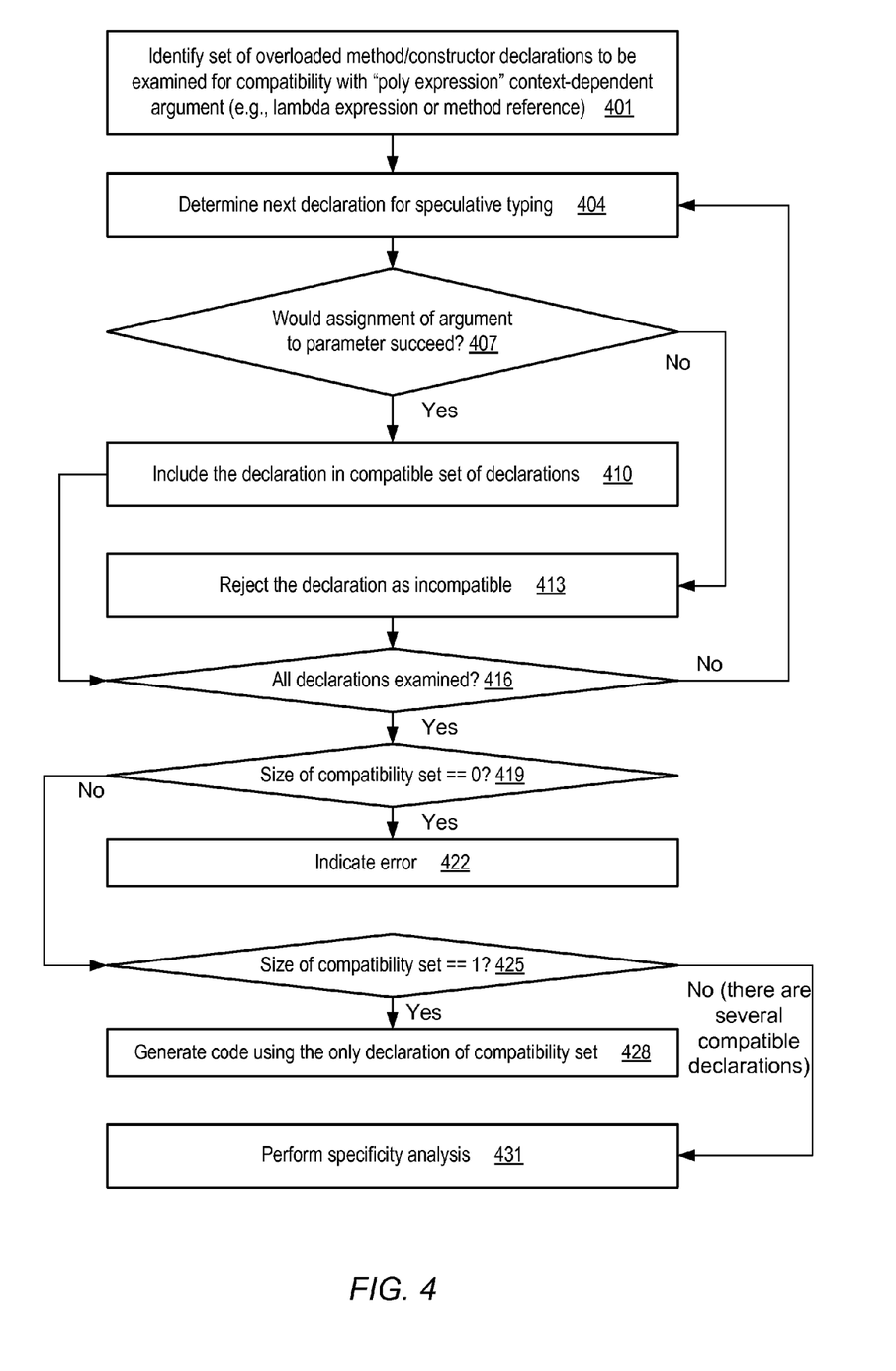
FIG. 4 illustrates aspects of operations that may be performed by a tool to identify a set of candidate compatible declarations to be considered during overload resolution, according to at least some embodiments.

FIG. 4 illustrates aspects of operations that may be performed by a tool, such as a compiler or an interpreter, to identify a set of candidate compatible declarations to be considered during overload resolution, according to at least some embodiments. The approach depicted in FIG. 4 may be termed "speculative typing" in at least some embodiments. As shown in element 401, a set of overloaded invocable operation declarations (e.g., method and constructor declarations) to be examined for compatibility with a poly expression argument (i.e., an argument whose type is context-dependent) may be identified. (Operations corresponding to a single-argument invocation are illustrated in FIG. 4; however, multiple-argument invocations may be dealt with in a similar way in some embodiments, with the same kind of analysis being performed for each of the multiple arguments and the corresponding declaration parameters. A declaration with multiple parameters may be deemed compatible with an invocation if each of the multiple arguments of the invocation is found to be compatible with the corresponding parameter in the declaration.) Each of the overloaded declarations may be examined in turn (or in parallel with the examination of one or more other declarations) in the depicted embodiment. As shown in element 404, the next declaration to be considered for the analysis may be identified.

As shown in element 407, a determination may be made, e.g., using the speculative parse tree branch generation operations discussed earlier, as to whether an assignment of the argument to the corresponding parameter (i.e., the parameter that appears in the same position in the list of parameters as the poly expression argument appears in the list of arguments) would succeed or fail. If the assignment would fail (as in the case of declaration 6.2 in Source Code Example 6 above), the declaration may be rejected as a candidate for further analysis in the depicted embodiment (element 413). If the assignment would succeed, as also determined in element 407, the declaration may be added to a compatible set of declarations (element 410) (as in the case of declaration 6.1 of Source Code Example 6).

If more declarations remain to be examined, as determined in element 416, the next declaration to be considered may be identified and the operations corresponding to elements 407 onwards may be repeated. If no more declarations remain, the size of the compatible set may be examined. If the size is zero (i.e., no compatible declarations were found) (as determined in element 419), an error may be indicated (element 422) since no suitable declaration can be used for executable code generation. If the size is one (as determined in element 425), no ambiguity regarding overload resolution remains, and the single compatible declaration may be used for code generation purposes (element 428). If more than one compatible declaration is found, further analysis to determine the most specific declaration among them may be required in the depicted embodiment (element 431). Such further analysis may comprise, in at least some embodiments, a pairwise comparison of the candidates, similar to that illustrated in FIG. 5.

Source Code Example 9 provides examples of the kinds of scenarios in which specificity analysis among a candidate set of compatible overloaded declarations may have to be performed in some embodiments.

Source Code Example 9

| | |
|---|---|
| 9.1. | interface Runnable { void run( ); } |
| 9.2. | interface StringGetter { String get( ); } |
| 9.3. | interface ObjectGetter { Object get( ); } |
| 9.4. | interface IntMapper { int map(int arg); } |
| 9.5. | interface StringMapper { String map(String arg); } |
| 9.6. | interface ToInteger { Integer get(int arg); } |
| 9.7. | interface ToNumber { Number get(int arg); } |
| 9.8. | |
| 9.9. | void m(Runnable r); |
| 9.10. | void m(StringGetter g); |
| 9.11. | void m(ObjectGetter g); |
| 9.12. | void m(IntMapper m); |
| 9.13. | void m(StringMapper m); |
| 9.14. | void m(ToInteger t); |
| 9.15. | void m(ToNumber t); |
| 9.16. | |
| 9.17. | m([lambda expression]); |

In Source Code Example 9, lines 9.9 through 9.15 show example overloaded declarations of method m whose (single) parameter in each case is one of the function types represented by the functional interfaces of lines 9.1 through 9.7. The invocation of m with a lambda expression as an argument (shown in line 9.17) is assumed to result in the determination (e.g., using the speculative typing approach described earlier) of a compatible candidate set that includes several of the declarations of lines 9.9 through 9.15. In such a scenario, a compiler or similar tool may be required to determine which among the compatible declarations is the most specific. Such analysis may include comparisons of the function descriptors corresponding to the declarations, taken two at a time, (pairwise comparisons) using a set of specificity rules or criteria defined for the language being used in some embodiments. In one embodiment, based on a particular set of such specificity criteria, some of the results of the comparisons may include the following:

"m(StringGetter)" is more specific than "m(ObjectGetter)" because the parameter type String is a subtype of the parameter type Object.

"m(ToInteger)" is more specific than "m(ToNumber)" because the return type Integer is a subtype of the return type Number.

"m(StringMapper)" and "m(IntMapper)" conflict, i.e., neither is more specific than the other, because their function descriptors have different parameter types. As a result, an error may be indicated in some embodiments if these two declarations are being analyzed for relative specificity.

"m(IntMapper)" is more specific than "m(ToInteger)" if the lambda body returns only primitives. Primitive types may be predefined by the language specification, and may be named using reserved keywords, such as int or float; in contrast to primitives, a data type for which, when an object of that data type is instantiated, a reference (in effect, a pointer) to a heap location storing the value of the instantiated object is created, may be called a reference type. Additional details regarding primitive types, reference types, and associated type conversion operations are provided below with reference to FIG. 5. It is noted that some programming languages may automatically convert expressions of a certain type to expressions of a different type, but the overload resolution mechanisms used may prefer to avoid these kinds of conversions if a candidate does not require them.

"m(ToInteger)" is more specific than "m(IntMapper)" if the lambda body returns only references.

"m(StringGetter)" is more specific than "m(Runnable)", because StringGetter returns a String while Runnable returns void.

Using the results of such pairwise comparisons, a single declaration that is more specific than all the other candidates may eventually be found in some embodiments. If such a single most specific declaration is found, that declaration may be used for code generation; otherwise, an error may be indicated.

Figure 5:
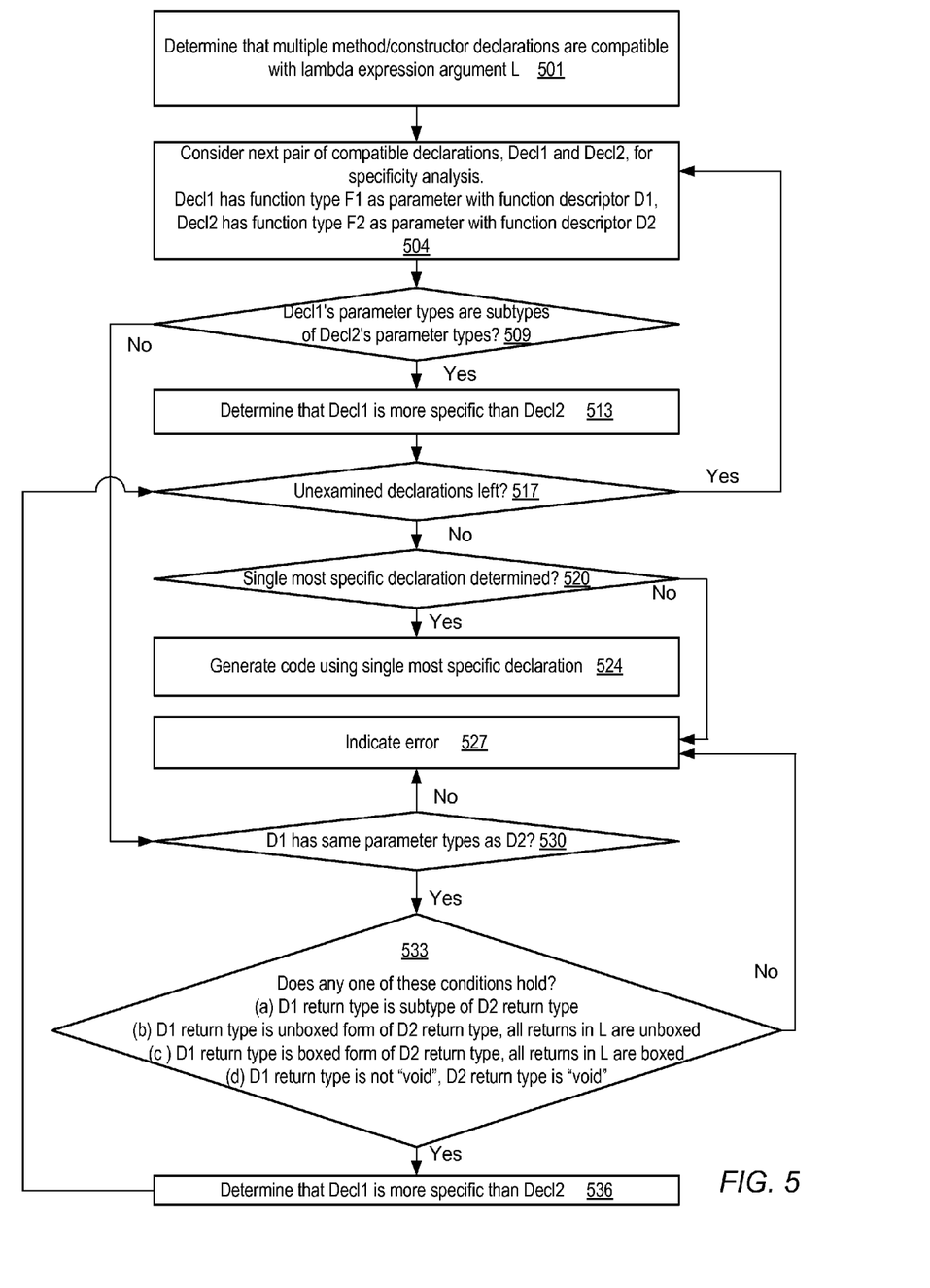
FIG. 5 illustrates aspects of operations that may be performed by a tool to identify a particular declaration, from among a set of candidate declarations, as the selected declaration for which code should be generated, according to at least some embodiments.

FIG. 5 illustrates aspects of operations such as those discussed with reference to Source Code Example 9, that may be performed by a tool to identify a particular declaration from among a set of compatible candidate declarations as the selected declaration for which code should be generated, according to at least some embodiments. As shown in element 501, a determination may be made that multiple invocation operation declarations are compatible with a lambda expression argument to an invocation. The declarations may be examined in pairs. The next pair of declarations Decl1 and Decl2 may be selected for specificity analysis (element 504), where Decl1 has a function type (or functional interface) F1 as a parameter, with function descriptor D1, and Decl2 has a function type F2 as a parameter with function descriptor D2 (see the discussion of Source Code Example 8 for details on function descriptors). The types of the parameters of the declarations may be compared initially in the depicted embodiment, and then, if the analysis based on parameter types fails to resolve the specificity order, further analysis may be performed using their return types of the function descriptors.

As shown in element 509, a determination may be made as to whether Decl1's parameter types are subtypes of the corresponding Decl2 parameter types. If Decl1's parameter types are subtypes of Decl2's parameter types, Decl1 may be deemed more specific than Decl2 (element 513). If there are other declarations that are yet to be examined (as determined in element 517, the next pair (which may include Decl1 and one of the remaining declarations) may be examined, starting with the operations of element 504 onwards.

If Decl1's parameter types are not subtypes of Decl2's parameter types (as determined in element 509), the compiler or interpreter may check whether D1 and D2 have the same parameter types (element 530). If they do not have the same parameter types, an error may be indicated (element 527), since the overload cannot be resolved, as in the case of comparing "m(StringMapper)" and "m(IntMapper)" in Source Code Example 9.

If D1 and D2 have the same parameter types (as also determined in element 530), further analysis may begin based on their respective return types. The four conditions illustrated in element 533 may be checked. If D1's return type is a subtype of D2's return type, Decl1 may be deemed more specific than Decl2, as in the case of the comparison of "m(ToInteger)" to "m(ToNumber)" above. If D1's return type is not "void", while D2's is "void", Decl1 may be deemed more specific (as in the case of "m(StringGetter)" being deemed more specific than "m(Runnable)" in Source Code Example 9).

In at least some programming languages that support primitive and reference types, a set of "wrapper" reference types may be defined for the primitive types: for example, the wrapper type Integer may be defined for the primitive type int in one embodiment. Conversion of a primitive value to an object of the corresponding wrapper type may be referred to as "boxing" the primitive value (with the result of the conversion being termed the "boxed" form of the value), and the extraction of the primitive value from an object of the corresponding wrapper class may be referred to as "unboxing" the wrapper (with the result being termed the "unboxed" form of the object). If the D1 return type is an unboxed form of D2's return type, and all of the lambda expression's return values are unboxed, Decl1 may also be deemed more specific than Decl2 (see the discussion of the comparison of "m(IntMapper)" and "m(ToInteger)" in Source Code Example 9). If the D1 return type is a boxed form of D2's return type, and if the returns from the lambda expression are all boxed, then Decl1 may also de determined to be more specific than Decl2.

If any of the conditions listed in element 533 are found to be true, a specificity ordering between Decl1 and decl2 may be made (element 536); otherwise, an error may be indicated. Similar analysis may be repeated for other unexamined pairs of declarations, until either an error is indicated because the overload cannot be resolved, or all the declarations have been examined and one declaration is found that is more specific than all the rest. If such a single most specific declaration is identified (element 520), it may be used to resolve the overload and generate the executable instructions for the invocation (element 524). It is noted that the rules or criteria used for specificity ordering may differ in different embodiments, e.g., the order in which the parameter types and return types are analyzed may differ in some embodiments from that shown in FIG. 5. It is also noted that some of the operations illustrated in FIGS. 3, 4, and 5 may be performed in a different order, in parallel rather than sequentially, or may be omitted in different embodiments. The operations illustrated in FIGS. 3, 4 and 5 with respect to lambda expressions and/or method references may be applied to other kinds of argument expressions whose type is context-dependent in various embodiments.

Figure 6:
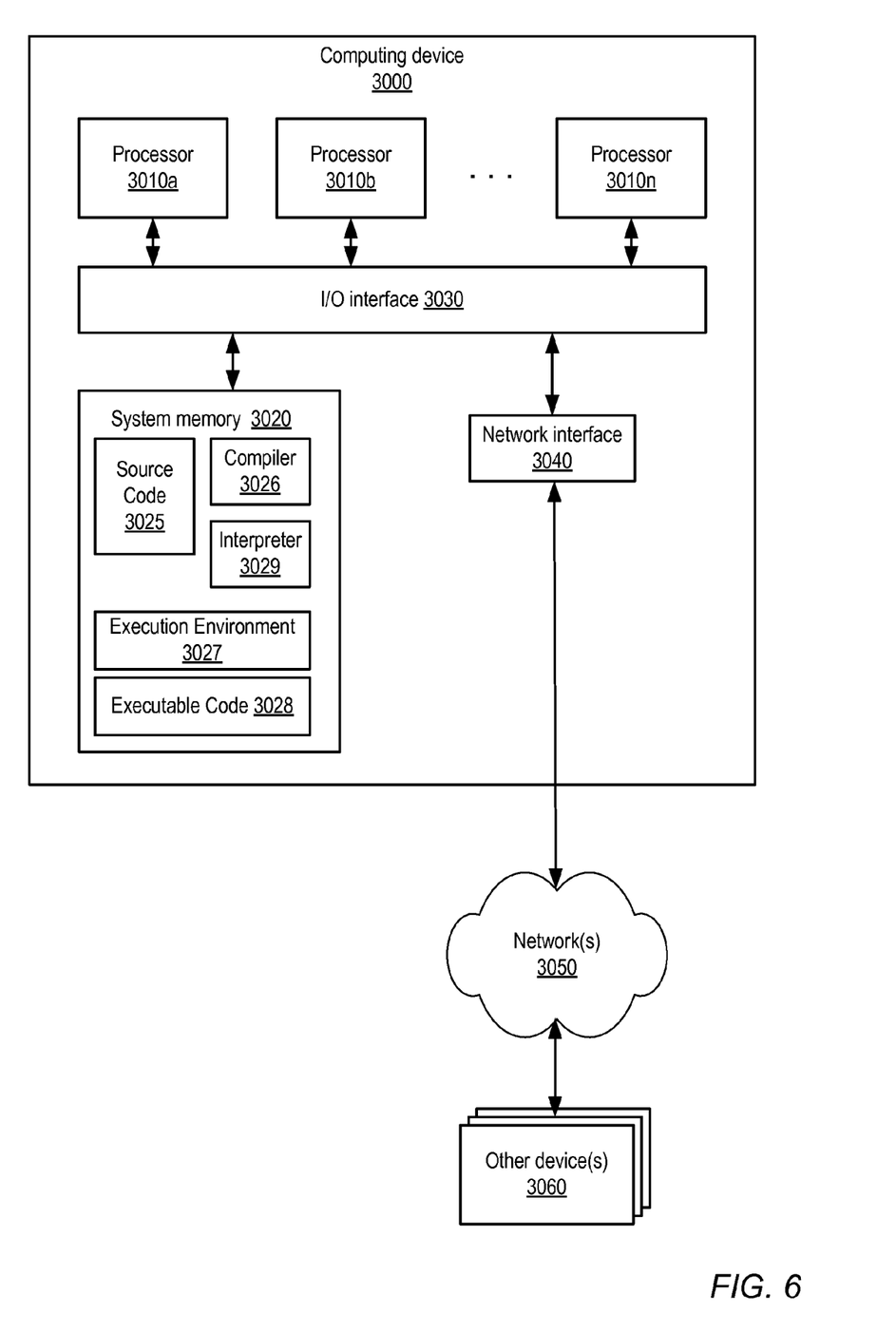
FIG. 6 illustrates an example computing device that may be used in some embodiments.

FIG. 6 is a block diagram illustrating a computing device 3000 configured to implement a compiler or an interpreter with support for the different types of operations described above, according to at least some embodiments. The computing device 3000 may correspond to any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device. In the illustrated embodiment, computing device 3000 includes one or more cores or processors 3010 (e.g., 3010*a*, 3010*b*, or 3010*n*) coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several cores or processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the SPARC, x86, PowerPC, or MIPS ISAs, or any other suitable ISA. In multiprocessor systems, each of processors 3010 may commonly, but not necessarily, implement the same ISA.

System memory 3020 may be configured to store program instructions implementing a compiler 3026, an interpreter 3029, source code 3025 of various programs to be compiled, executable code 3028 generated by the compiler or other compilers, and an execution environment 3027 similar to runtime environment 140 of FIG. 1. System memory may also include program instructions and/or data for various other applications. Program instructions may be encoded in platform native binary, any interpreted language such as Java™ bytecode, or in any other language such as C/C++, Java™, etc or in any combination thereof. In various embodiments, system memory 3020 may be implemented using any suitable memory technology, such as static random access memory (SRAM), synchronous dynamic RAM (SDRAM), nonvolatile/Flash-type memory, or any other type of memory.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 5 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 6 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more computing devices comprising one or more hardware processors,
wherein the one or more computing devices are configured to:
determine, for an overloaded operation invocation identified in source code of a computer program, whether the source code includes, as an argument to the invocation, an expression whose type is context-dependent; and
in response to a determination that the source code includes, as an argument to the invocation, an expression whose type is context-dependent,
determine, at an overload resolver to which the expression is provided as input, (a) whether each argument of the invocation, including the expression, is compatible with a type of a corresponding parameter indicated in one or more invocable operation declarations identified from the source code, and (b) whether a particular invocable operation declaration of the one or more Invocable operation declarations is identifiable as the most specific invocable operation declaration for the invocation based at least in part on one or more specificity criteria;
in response to a determination that (a) each argument of the invocation is compatible with a type of a corresponding parameter indicated in one or more invocable operation declarations in the source code, and (b) a particular invocable operation declaration of the one or more invocable operation declarations is identifiable as the most specific invocable operation declaration for the invocation, generate executable instructions for the invocation in accordance with the particular invocable operation declaration; and
in response to a determination that none of the plurality of invocable operation declarations is identifiable as the most specific invocable operation declaration for the invocation, generate an error indication; wherein the error is generated even though each argument of the invocation is compatible with a type of a corresponding parameter indicated in a plurality of invocable operation declarations in the source code.

2. The system as recited in claim 1, wherein the overloaded operation invocation comprises one of: a method invocation, or a constructor invocation.

3. The system as recited in claim 1, wherein the expression whose type is context-dependent comprises a lambda expression.

4. The system as recited in claim 1, wherein the expression whose type is context-dependent comprises a method reference.

5. The system as recited in claim 1, wherein to determine whether the expression is compatible with a type of a corresponding parameter indicated in one or more invocable operation declarations identified from the source code, the one or more computing devices are further configured to:
    determine, as part of a speculative typing analysis, whether an assignment operation in which the expression is assigned to the corresponding parameter indicated in a particular invocable operation declaration would result in an error.

6. The system as recited in claim 1, wherein said expression whose type is context-dependent comprises a lambda expression, wherein said one or more invocable operation declarations comprise (a) a first method declaration with a first function type as a parameter and (b) a second method declaration with a second function type as a parameter, wherein to determine whether a particular invocable operation declaration of the one or more invocable operation declarations is identifiable as the most specific invocable operation declaration for the invocation based at least in part on one or more specificity criteria, the one or more computing devices are configured to:
    determine whether parameter types of the first method declaration are subtypes of corresponding parameter types of the second method declaration; and
    in response to determining that parameter types of the first method declaration are subtypes of the corresponding parameter types of the second method declaration, determine that the first method declaration is more specific than the second method declaration.

7. The system as recited in claim 6, wherein the one or more computing devices are further configured to:
    in response to determining that parameter types of the first method declaration are not subtypes of corresponding parameter types of the second method declaration,
        determine whether the first and second function types have the same function descriptor parameter types; and
        in response to determining that the first and second function types have the same function descriptor parameter types, determine that the first method declaration is more specific than the second method declaration based at least in part on an analysis of at least the function descriptor return types of the first and second methods.

8. The system as recited in claim 7, wherein to perform said analysis of at least the function descriptor return types of the first and second methods, the one or more computing devices are configured to:
    determine at least one of: (a) whether a function descriptor return type of the first function type is a subtype of the function descriptor return type of the second function type; (b) whether a function descriptor return type of the first function type is the unboxed form of the function descriptor return type of the second function type, and all returns in the lambda expression are unboxed; (c) whether a function descriptor return type of the first function type is the boxed form of the function descriptor return type of the second function type, and all returns in the lambda expression are boxed; or (d) whether a function descriptor return type of the first function type is non-void and the function descriptor return type of the second function type is void.

9. A non-transitory computer-readable storage medium storing program instructions executable by on one or more processors to implement a tool configured to:
    determine, for an overloaded operation invocation identified in source code of a computer program, whether the source code includes, as an argument to the invocation, an expression whose type is context-dependent; and
    in response to a determination that the source code includes, as an argument to the invocation, an expression whose type is context-dependent,
        determine, at an overload resolver to which the expression is provided as input, (a) whether each argument of the invocation, including the expression, is compatible with a type of a corresponding parameter indicated in one or more invocable operation declarations identified from the source code, and (b) whether a particular invocable operation declaration of the one or more invocable operation declarations is identifiable as the most specific invocable operation declaration for the invocation based at least in part on one or more specificity criteria;
    in response to a determination that (a) each argument of the invocation is compatible with a type of a corresponding parameter indicated in one or more invocable operation declarations in the source code, and (b) a particular invocable operation declaration of the one or more invocable operation declarations is identifiable as the most specific invocable operation declaration for the invocation, generate executable instructions for the invocation in accordance with the particular invocable operation declaration; and
    in response to a determination that none of the plurality of invocable operation declarations is identifiable as the most specific invocable operation declaration for the invocation, generate an error indication; wherein the error is generated even though each argument of the invocation is compatible with a type of a corresponding parameter indicated in a plurality of invocable operation declarations in the source code.

10. The non-transitory computer-readable storage medium as recited in claim 9, wherein the overloaded operation invocation comprises one of: a method invocation, or a constructor invocation.

11. The non-transitory computer-readable storage medium as recited in claim 9, wherein the tool comprises one of: a compiler, or an interpreter.

12. The non-transitory computer-readable storage medium as recited in claim 9, wherein to determine whether the expression is compatible with a type of a corresponding parameter indicated in one or more invocable operation declarations identified from the source code, the tool is further configured to:
    determine, as part of a speculative typing analysis, whether an assignment operation in which the expression is assigned to the corresponding parameter indicated in a particular invocable operation declaration would result in an error.

13. The non-transitory computer-readable storage medium as recited in claim 9, wherein said expression whose type is context-dependent comprises a lambda expression, wherein said one or more invocable operation declarations comprise (a) a first method declaration with a first function type as a parameter and (b) a second method declaration with a second function type as a parameter, wherein to determine whether a particular invocable operation declaration of the one or more invocable operation declarations is identifiable as the most specific invocable operation declaration for the invocation based at least in part on one or more specificity criteria, the tool is further configured to:

perform a first analysis to determine whether the first method is more specific than the second method, wherein the first analysis comprises a comparison of the respective parameter types of the first and second method declarations; and in response to a determination that the first analysis fails to indicate a specificity ordering between the first and second method declarations, perform a second analysis to determine whether the first method declaration is more specific than the second method declaration, wherein the second analysis comprises a comparison of respective function descriptor return types of the first and second method declarations.

14. A method, comprising:

determining, for an overloaded operation invocation identified in source code of a computer program, whether the source code includes, as an argument to the invocation, an expression whose type is context-dependent; and in response to determining that the source code includes, as an argument to the invocation, an expression whose type is context-dependent,
providing the expression as an input to an overload resolver;
determining, at the overload resolver (a) whether each argument of the invocation, including the expression, is compatible with a type of a corresponding parameter indicated in one or more invocable operation declarations identified from the source code, and (b) whether a particular invocable operation declaration of the one or more invocable operation declarations is identifiable as the most specific invocable operation declaration for the invocation based at least in part on one or more specificity criteria;
in response to determining that (a) each argument of the invocation is compatible with a type of a corresponding parameter indicated in one or more invocable operation declarations in the source code, and (b) a particular invocable operation declaration of the one or more invocable operation declarations is identifiable as the most specific invocable operation declaration for the invocation, generating executable instructions for the invocation in accordance with the particular invocable operation declaration; and
in response to determining that none of the plurality of invocable operation declarations is identifiable as the most specific invocable operation declaration for the invocation, generate an error indication; wherein the error is generated even though each argument of the invocation is compatible with a type of a corresponding parameter indicated in a plurality of invocable operation declarations in the source code.

15. The method as recited in claim 14, wherein the overloaded operation invocation comprises one of: a method invocation, or a constructor invocation.

16. The method as recited in claim 14, wherein the expression comprises one of: a lambda expression, or a method reference.

17. The method as recited in claim 14, wherein said determining whether the expression is compatible with a type of a corresponding parameter indicated in one or more invocable operation declarations identified from the source code comprises:
determining, as part of a speculative typing analysis, whether an assignment operation in which the expression is assigned to the corresponding parameter indicated in a particular invocable operation declaration would result in an error.

18. The method as recited in claim 14, wherein said expression whose type is context-dependent comprises a lambda expression, wherein said one or more invocable operation declarations comprise (a) a first method declaration with a first function type as a parameter and (b) a second method declaration with a second function type as a parameter, wherein said determining whether a particular invocable operation declaration of the one or more invocable operation declarations is identifiable as the most specific invocable operation declaration for the invocation based at least in part on one or more specificity criteria comprises:
performing a first analysis to determine whether the first method is more specific than the second method, wherein the first analysis comprises a comparison of the respective parameter types of the first and second method declarations; and
performing, in response to determining that the first analysis fails to indicate a specificity ordering between the first and second method declarations, a second analysis to determine whether the first method declaration is more specific than the second method declaration, wherein the second analysis comprises a comparison of respective function descriptor return types of the first and second method declarations.

19. The method as recited in claim 18, wherein performing the second analysis comprises:
determining at least one of: (a) whether a function descriptor return type of the first function type is a subtype of the function descriptor return type of the second function type; (b) whether a function descriptor return type of the first function type is the unboxed form of the function descriptor return type of the second function type, and all returns in the lambda expression are unboxed; (c) whether a function descriptor return type of the first function type is the boxed form of the function descriptor return type of the second function type, and all returns in the lambda expression are boxed; or (d) whether a function descriptor return type of the first function type is non-void and the function descriptor return type of the second function type is void.

* * * * *

UNITED STATES PATENT AND TRADEMARK OFFICE
CERTIFICATE OF CORRECTION

PATENT NO. : 9,524,175 B2
APPLICATION NO. : 13/677001
DATED : December 20, 2016
INVENTOR(S) : Cimadamore et al.

It is certified that error appears in the above-identified patent and that said Letters Patent is hereby corrected as shown below:

In the Claims

In Column 18, Line 31, in Claim 1, delete "Invocable" and insert -- invocable --, therefor.

Signed and Sealed this
Twentieth Day of June, 2017

Joseph Matal
*Performing the Functions and Duties of the
Under Secretary of Commerce for Intellectual Property and
Director of the United States Patent and Trademark Office*